United States Patent
Tilly et al.

(10) Patent No.: US 9,980,160 B2
(45) Date of Patent: May 22, 2018

(54) INTERFERENCE MITIGATION IN DENSE MESH NETWORKS

(71) Applicant: TerraNet AB, Lund (SE)

(72) Inventors: Lars Tilly, Limhamn (SE); Stig Halvarsson, Lund (SE)

(73) Assignee: TERRANET AB, Lund (SE)

( * ) Notice: Subject to any disclaimer, the term of this patent is extended or adjusted under 35 U.S.C. 154(b) by 183 days.

(21) Appl. No.: 14/951,929

(22) Filed: Nov. 25, 2015

(65) Prior Publication Data

US 2017/0150379 A1    May 25, 2017

(51) Int. Cl.
*H04L 12/28*    (2006.01)
*H04W 24/04*    (2009.01)
(Continued)

(52) U.S. Cl.
CPC .......... *H04W 24/04* (2013.01); *H04L 43/0829* (2013.01); *H04W 36/20* (2013.01); *H04W 36/06* (2013.01); *H04W 84/18* (2013.01)

(58) Field of Classification Search
CPC ............. H04L 12/2634; H04L 12/2644; H04L 12/2647; H04L 12/2649; H04L 12/2652;
(Continued)

(56) References Cited

U.S. PATENT DOCUMENTS 8,194,567 B2    6/2012    Erwin et al.
2005/0122999 A1    6/2005    Scherzer et al.
(Continued)

FOREIGN PATENT DOCUMENTS

WO    2011015905 A1    2/2011

OTHER PUBLICATIONS

International Search Report and Written Opinion of PCT/SE2016/051166 dated Feb. 16, 2017, all enclosed pages.

*Primary Examiner* — Alvin Zhu
(74) *Attorney, Agent, or Firm* — McNair Law Firm, P.A.

(57) ABSTRACT

Disclosed is a station of a mesh network, wherein the station is configured to transmit and receive data packets comprising a header which comprises a mesh mode channel switch announcement element and a mesh channel switch parameter element. The station also comprises:
 a controller, which is configured to initiate communication with at least one second station on a first communication channel;
 a transceiver, which is configured to transmit and receive data packets to and from the at least one second station on the first communication channel;
 a counter, which is configured to monitor an amount of lost data packets.
If the amount of lost data packets exceeds a drop threshold, the controller is further configured to determine if at least one communication criterion is fulfilled. If the controller determines that the at least one communication criterion is fulfilled, then the controller is configured to move the communication from the first communication channel to a second communication channel during the remainder of the communication.
The movement of the communication from the first communication channel to the second communication channel is unrestricted in time or time scheduled.
A method for a mesh station as well as a computer program product is also disclosed.

19 Claims, 5 Drawing Sheets

(51) Int. Cl.
*H04L 12/26* (2006.01)
*H04W 36/20* (2009.01)
H04W 84/18 (2009.01)
H04W 36/06 (2009.01)

(58) Field of Classification Search
CPC ............. H04L 43/0829; H04L 43/0835; H04L 43/0841
See application file for complete search history.

(56) References Cited

U.S. PATENT DOCUMENTS

| | | | |
|---|---|---|---|
| 2006/0217062 A1 | 9/2006 | Saffre et al. | |
| 2007/0070937 A1 | 3/2007 | Demirhan et al. | |
| 2008/0253386 A1 | 10/2008 | Barum | |
| 2011/0249631 A1* | 10/2011 | Li | H04W 72/04 370/329 |
| 2012/0026997 A1* | 2/2012 | Seok | H04L 5/001 370/338 |
| 2012/0195220 A1* | 8/2012 | Kurt | H04W 72/085 370/252 |
| 2015/0230093 A1* | 8/2015 | Park | H04W 12/08 726/4 |
| 2015/0264589 A1 | 9/2015 | Kalkunte | |
| 2016/0066249 A1* | 3/2016 | Dukes | H04W 40/246 370/255 |
| 2016/0192172 A1* | 6/2016 | Kim | G08G 1/096791 370/329 |
| 2017/0064618 A1* | 3/2017 | Katar | H04W 48/16 |

* cited by examiner

INTERFERENCE MITIGATION IN DENSE MESH NETWORKS

TECHNICAL FIELD

The present invention relates generally to the field of mesh networks. More particularly it relates to interference free communication in mesh networks.

BACKGROUND

A mesh network is built up with nodes (also denoted as stations in this disclosure) that typically are connected to neighbors within the range of a radio connection of the nodes, i.e. how far their communication signals may propagate. The range of the radio connection is typically determined by parameters such as output power and sensitivity of the radio transceiver which is used for the communication. However, in large and dense mesh networks several nodes may be located within the same radio connection range. This typically leads to that connectivity and capacity in the mesh network becomes limited because of interference between the nodes.

Another challenge of the mesh networks is typically to ensure that a node is heard by sufficiently many neighbors (also denoted as peers in this disclosure) so that all nodes are able to connect to all other nodes within the mesh either directly or by multihop. When nodes within the mesh network are too far apart, background noise may typically limit the system performance such that the mesh network is not fully connected. On the other hand, if the nodes are too close they typically interfere with each other's transmissions since they have to share sparse radio resources. This also typically results in a system limitation since interference from other transmitting nodes in the mesh network or other transmitting nodes such as from other mesh networks typically causes increasingly high bit error rate in transmission of data packets.

Therefore there is a need for solutions which minimize interference between nodes in dense network environments.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to mitigate at least some of the above disadvantages and to provide a station of a mesh network, a method for a station in a mesh network and a computer program product achieving this.

According to a first aspect, this is achieved by a station of a mesh network wherein the station is configured to transmit and receive data packets comprising a header which comprises a mesh mode channel switch announcement element and a mesh channel switch parameter element. The station also comprises:

a controller, which is configured to initiate communication with at least one second station on a first communication channel;

a transceiver, which is configured to transmit and receive data packets to and from the at least one second station on the first communication channel;

a counter, which is configured to monitor an amount of lost data packets.

If the amount of lost data packets exceeds a drop threshold, the controller is further configured to determine if at least one communication criterion is fulfilled. If the controller determines that the at least one communication criterion is fulfilled, then the controller is configured to move the communication from the first communication channel to a second communication channel during the remainder of the communication.

The movement of the communication from the first communication channel to the second communication channel is unrestricted in time or time scheduled.

In some embodiments, a frequency of the first communication channel is separate from a frequency of the second communication channel.

In some embodiments, the at least one communication criterion is fulfilled if the station experience a RSSI—received signal strength indicator—value above an RSSI threshold.

In some embodiments, the at least one communication criterion is fulfilled if the mesh network comprises a number of peers exceeding a peer threshold.

If the number of peers exceeds the peer threshold, it is an indication that the mesh network is crowded and that the risk of interference is high.

The peer threshold may be set based on different network parameters, such as geographical information. E.g. size of the mesh network, where it is located, signal strength in the area, topology etc.

In some embodiments, the station is configured to, prior to moving the communication from the first communication channel to the second communication channel, set the mesh mode channel switch announcement element and the mesh channel switch parameter element in the data packet header.

The setting of the mesh mode channel switch announcement element and the mesh channel switch parameter element in the data packet header informs the other station and peers within the mesh network that a channel switch is to take place.

In some embodiments, the mesh station is configured to return to the first communication channel when the communication with the at least one second station is terminated.

Thus the stations may again listen to other peers within the mesh, so that they are available to initiate new communications.

In some embodiments, the communication is a stream of data packets.

In some embodiments, the communication is a voice call.

In some embodiments the communication may be either a stream of data packets or a voice call or both.

In some embodiments, the station is further configured to schedule the change of communication channel by using a time slot booking mechanism so that the change of communication channel is scheduled and booked in coordination with other peers and that the stations involved in the communication communicate using a same time slot and channel settings.

In case of 802.11 MESH, the time slot booking mechanism may in some embodiments be according to the MCCA function to schedule and book the change of communication channel in coordination with other stations within the network.

A second aspect is a method for a station in a mesh network, wherein the station is configured to transmit and receive data packets comprising a header which comprises a mesh mode channel switch announcement element and a mesh channel switch parameter element. The method comprises to:

initiating communication with at least one second station on a first communication channel;

transmitting and receiving data packets to and from the at least one second station on the first communication channel;

monitoring an amount of lost data packets.

In case that the amount of lost data packets exceeds a drop threshold, the method comprises to determine if at least one communication criterion is fulfilled, and if the at least one communication criterion is fulfilled, moving the communication from the first communication channel to a second communication channel during the remainder of the communication, wherein the movement of the communication from the first communication channel to the second communication channel is unrestricted in time or time scheduled.

A third aspect is a computer program product comprising a computer readable medium, having thereon a computer program comprising program instructions, wherein the computer program is loadable into a data-processing unit and adapted to cause execution of the method according to claim 20 when the computer program is run by the data-processing unit.

A fourth aspect is a mesh network comprising at least one station according to the first aspect and adapted to perform the method according to the second aspect.

It is to be understood that the second and fourth aspect may comprise technical features corresponding to the first aspect, and vice versa.

An advantage of some embodiments is that interference in a mesh network caused by too many communicating stations is reduced.

Another advantage of some embodiments is that the over all throughput within a mesh network is increased.

Another advantage of some embodiments is that mesh networks will have the capability to accommodate large amounts of mesh stations without increasing interference.

Another advantage of some embodiments is that resources within the mesh network are distributed more evenly.

BRIEF DESCRIPTION OF THE DRAWINGS

Further objects, features and advantages will appear from the following detailed description of embodiments, with reference being made to the accompanying drawings, in which:

FIG. 1, which includes

DETAILED DESCRIPTION

In the following, embodiments will be described where a station of a mesh network and a method for a station in a mesh network is provided which enables reduced interference within dense mesh networks.

Like numbers refer to like elements throughout.

Figures 1A, 1B:
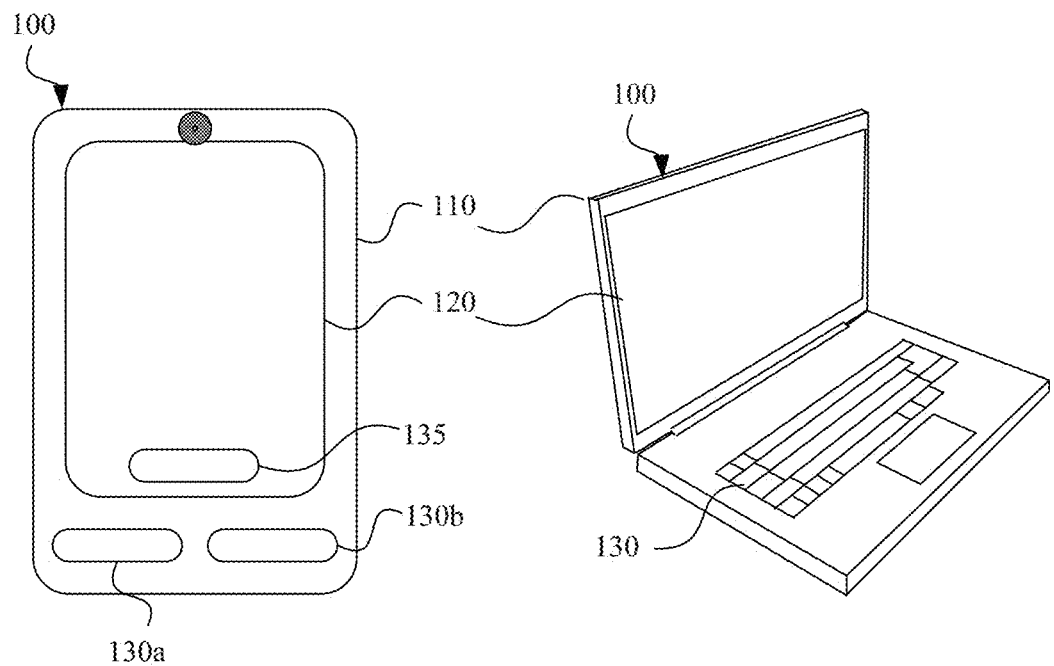
FIGS. 1a and 1b, illustrates mesh network stations according to some embodiments.

FIGS. 1a and 1b generally show a station 100 according to an embodiment herein. In one embodiment the station 100 is configured for wireless or radio frequency network communication for acting as a node in a mesh network. An example of a mesh network will be described with reference to FIG. 3. Examples of such a station 100 are: a personal computer, desktop or laptop, a tablet computer, a mobile telephone, a smart phone and a personal digital assistant.

Two embodiments will be exemplified and described as being a smartphone in FIG. 1a and a laptop computer 100 in FIG. 1b.

Referring to FIG. 1a, a smartphone 100 comprises a housing 110 in which a display 120 is arranged. In one embodiment the display 120 is a touch display. In other embodiments the display 120 is a non-touch display. Furthermore, the smartphone 100 comprises two keys 130a, 130b. In this embodiment there are two keys 130, but any number of keys is possible and depends on the design of the smartphone 100. In one embodiment the smartphone 100 is configured to display and operate a virtual key 135 on the touch display 120. It should be noted that the number of virtual keys 135 are dependant on the design of the smartphone 100 and an application that is executed on the smartphone 100.

Referring to FIG. 1b, a laptop computer 100 comprises a display 120 and a housing 110. The housing comprises a controller or CPU (not shown) and one or more computer-readable storage mediums (not shown), such as storage units and internal memory. Examples of storage units are disk drives or hard drives. The station 100 further comprises at least one data port. Data ports can be wired and/or wireless. Examples of data ports are USB (Universal Serial Bus) ports, Ethernet ports or WiFi (according to IEEE standard 802.11) ports. Data ports are configured to enable a station 100 to connect with other stations or a server.

The station 100 further comprises at least one input unit such as a keyboard 130. Other examples of input units are computer mouse, touch pads, touch screens or joysticks to name a few.

Figure 2:
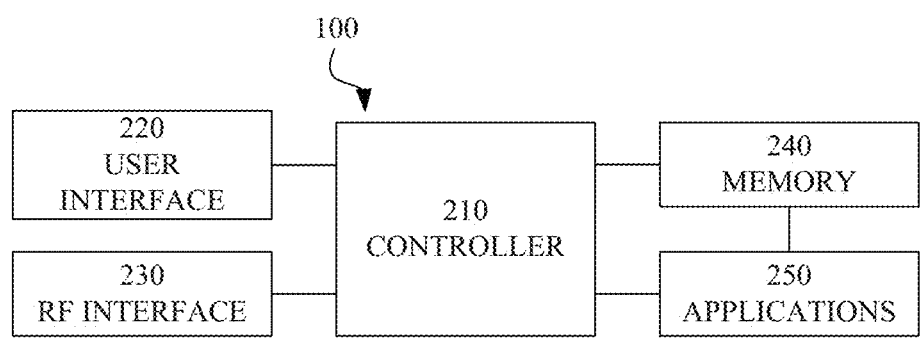
FIG. 2 illustrates an arrangement of a mesh network station according to some embodiments.

FIG. 2 shows a schematic view of the general structure of a station according to FIGS. 1a and 1b. The station 100 comprises a controller 210 which is responsible for the overall operation of the station 100 and is preferably implemented by any commercially available CPU ("Central Processing Unit"), DSP ("Digital Signal Processor") or any other electronic programmable logic device. The controller 210 may be implemented using instructions that enable hardware functionality, for example, by using executable computer program instructions in a general-purpose or special-purpose processor that may be stored on a computer readable storage medium (disk, memory etc) 240 to be executed by such a processor. The controller 210 is configured to read instructions from the memory 240 and execute these instructions to control the operation of the station 100. The memory 240 may be implemented using any commonly known technology for computer-readable memories such as ROM, RAM, SRAM, DRAM, CMOS, FLASH, DDR, SDRAM or some other memory technology. The memory 240 is used for various purposes by the controller 210, one of them being for storing application data and program instructions 250 for various software modules in the station 100. The software modules include a real-time operating system, drivers for a user interface, an application handler as well as various applications 250. The applications are sets of instructions that when executed by the controller 210 control the operation of the station 100. The applications 250 can include a messaging application such as electronic mail, a browsing application, a media player application, as well as various other applications 250, such as applications for voice calling, video calling, document reading and/or document editing, an instant messaging application, a calendar application, a control panel application, one or more video games, a notepad application, Short Message Service applications, location finding applications, electronic mailing and internet browsing applications.

The station 100 may further comprise a user interface 220, which in the station of FIGS. 1a and 1b is comprised of the display 120 and the keys 130, 135.

The station 100 further comprises a radio frequency interface 230, which is adapted to allow the station to communicate with other devices via a radio frequency band through the use of different radio frequency technologies. Examples of such technologies are IEEE 802.11, IEEE 802.11s, IEEE 802.11 Mesh and Bluetooth® to name a few. Other examples of radio technologies for example for communicating with devices outside the mesh network that may be implemented in a station 100 are W-CDMA, GSM, UTRAN, LTE, NMT to name a few.

Figure 3:
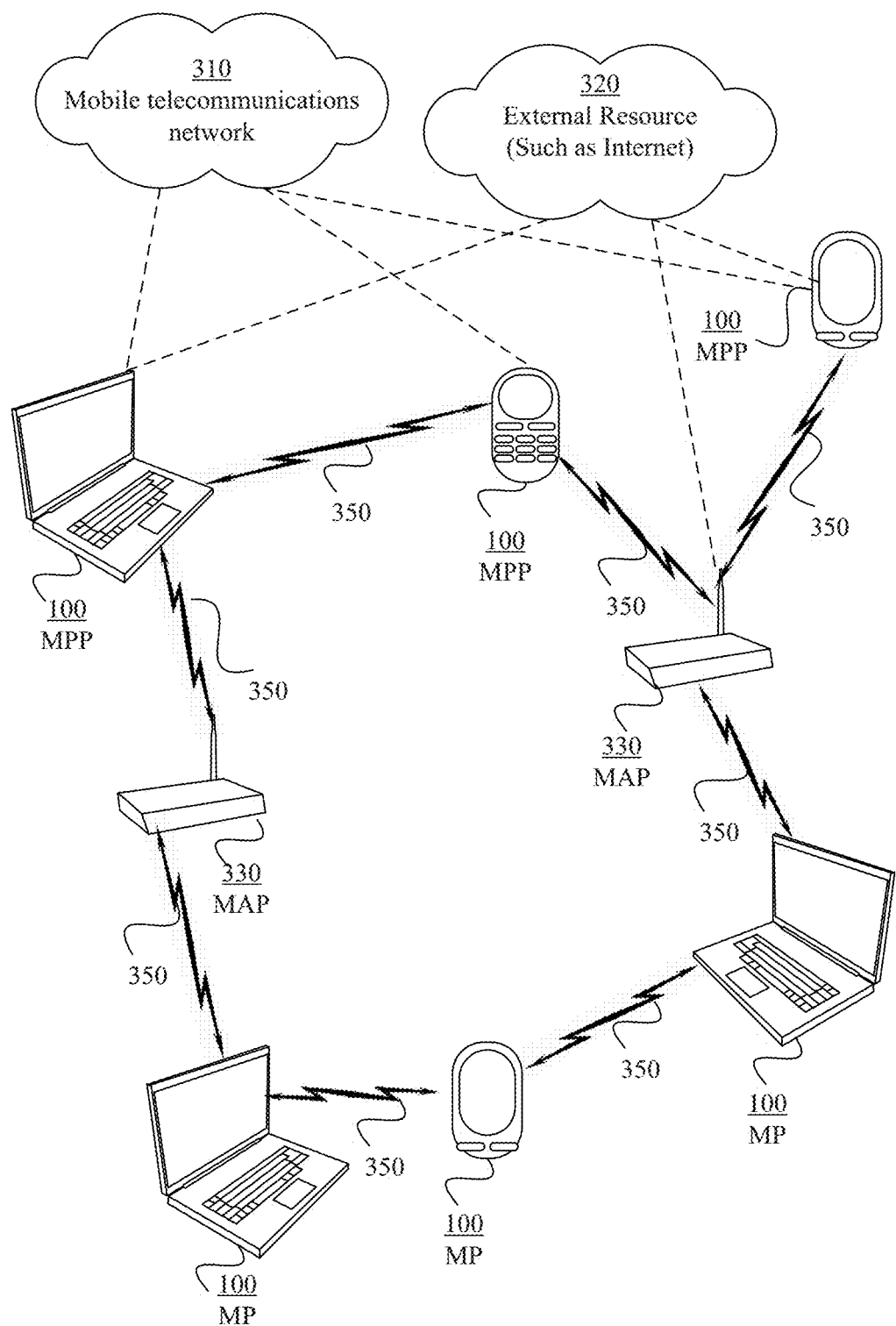
FIG. 3 illustrates a mesh network according to some embodiments.

FIG. 3 shows a mesh network 300. A mesh network 300 comprises a plurality of nodes which may be a station 100 as in FIGS. 1a, 1b and 2. The mesh network 300 may also comprise at least one access point 330, referred to as a Mesh Access Point (MAP). A network without any access points 330 is called an ad hoc network. A MAP 330 is also an example of a network node. In a mesh network 300 each node 330, 100 is configured to capture and disseminate data that is aimed for the specific node. Each node 330, 100 is also configured to serve as a relay for other nodes 100, that is, the node 100 must collaborate to propagate data in the network 300. The mesh access points 330 are configured to serve as relays and routers for the other nodes 100. The nodes 330, 100 are configured to connect to one another through links or connections 350.

The network shown in FIG. 3 is a wireless mesh network and the stations 100 and the access points 330 (if any) are configured to establish the wireless links 350 for communicating with one another.

In this example, the mesh network is arranged to operate according to the IEEE 802.11 Mesh standard. There are three types of nodes 330, 100 in such a mesh network, namely Mesh Points (MP), Mesh Portal Points (MPP) and Mesh Access Points (MAP).

An MP is often a laptop, smartphone or other wireless device, such as has been disclosed in the above with reference to FIGS. 1a and 1b, and supports a peer protocol for discovering neighboring nodes and maintaining an overview of them. In IEEE 802.11 Mesh this peer protocol is called Peer Link Management protocol.

The discovery process is implemented so that a node transmits a beacon. A beacon is a data package that is transmitted periodically and carries information identifying the node transmitting it. Other data carried in the beacon includes Path Selection Protocol ID, Path Selection metric, Congestion Control Mode, Synchronization Protocol ID, Authentication Protocol ID, Mesh Formation Info and Mesh Capability. Nodes 330, 100 in a mesh network receive this information and each node 330, 100 is thus aware of its surrounding network environment.

The MPs also support a protocol for communicating with other nodes, nodes that are not necessarily neighbors to the MP. In IEEE 802.11 Mesh this peer protocol is called Hybrid Wireless Mesh Protocol (HWMP). It is hybrid because it supports two kinds of path selection protocols. In IEEE 802.11 Mesh the protocols use the MAC addresses for addressing a data package correctly. Each node 330, 100 is configured to find a path from one node 330, 100 to another node 330, 100. This is referred to as path selection.

An MPP is configured to provide gateway functionality to the mesh network. The MPP may for example be a portal to the internet 320 or a communication network 310, such as a mobile telecommunications network. An MPP must thus be configured to bridge at least two interface protocols. An MPP is often a laptop, a cell phone or other wireless device.

A MAP is an access point that is configured to also communicate according to the mesh network standard and to operate as an access point.

In the mesh network 300 of FIG. 3 there are eight nodes 330, 100 whereof three are laptops, three are smartphones and two are routers. Two nodes are MAPs, three nodes are MPs and at least two nodes are MPPs. It should be noted that a node may have the capability to act as both an MP and an MPP. For example, the MPs of the example mesh network of FIG. 3 may actually also be MPPs. For clarity issues, only three nodes are illustrated as having internet capability and three as having capabilities for mobile telecommunication.

A mesh network can be designed using a flooding technique or a routing technique. When using a routing technique, a message propagates from a sending node 100 to receiving node 100 along a path, by hopping from node 100 to node 100 until the receiving node 100 is reached. To ensure that all paths are available, a routing network must allow for continuous connections and reconfiguration around broken or blocked paths, using self-healing algorithms. According to the standard IEEE 802.11 Mesh should a path be broken this will be discovered after a time period (e.g. 5 s) when a sending node detects that reception is not acknowledged. The system then performs a rerouting procedure by sending out path requests (PREM).

The self-healing capability enables a routing-based network to operate when one node breaks down or a connection goes bad. As a result, the network is typically quite reliable, as there is often more than one path between a source and a destination in the network. Although mostly used in wireless scenarios, this concept is also applicable to wired networks and software interaction.

Mesh networks may be large or small, a mesh network may be made up of hundreds of stations or by just a few such as two or three stations. Too small or too large mesh networks each presents problems in connectivity and performance issues of the mesh network.

Figure 4:
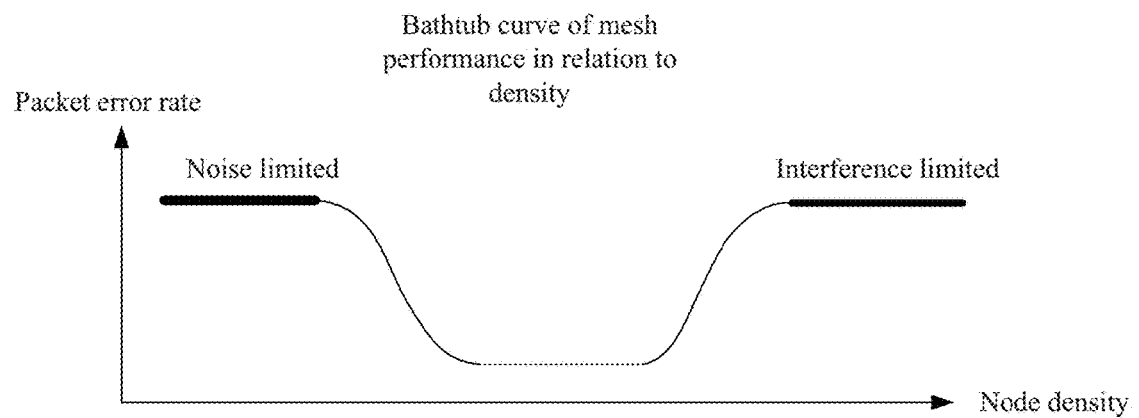
FIG. 4 illustrates a plot over inference versus number of nodes in a mesh network according to prior art.

FIG. 4 illustrates a curve of the performance for a mesh network, such as the network in FIG. 3, in relation to density of stations according to prior art. The curve is a bathtub curve having a dip where the mesh network comprises enough stations to ensure good connectivity between the respective stations, i.e. distance between the stations it not too large, while still not being too dense. If the mesh network comprises too few stations, the packet error rate increases since background noise becomes a factor in transmission when the distance between stations is too far. On the other end of the curve, the mesh network comprises too many stations which results in increased packet error rate because of interference between neighboring stations within the network, and also in some cases from neighboring mesh networks.

The inventors have after insightful reasoning realized that the packet error rate and interference may be lessened and the connectivity of the mesh network increased if communication between stations in a dense mesh network is moved from a first communication channel to a second communication channel, where the two channels have separate frequencies, if it is detected that an increasing amount of packets are lost in transmission.

Figure 5:
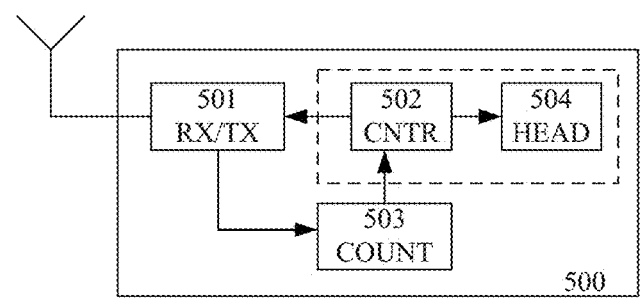
FIG. 5 illustrates a mesh network station according to some embodiments.

FIG. 5 illustrates a station 500 of a mesh network according to some embodiments. The station 500 may e.g. be the same as the station 100 as described in FIGS. 1, 2 and 3.

The station 500 comprises a transceiver (RX/TX) 501, a controller (CNTR) 502, header setter (HEAD) 504 and a counter (COUNT) 503.

The station 500 is configured to initiate communication with a second station in the mesh network (compare with FIG. 3) on a first communication channel. When the communication is established, data packets are transmitted and received through transceiver 501. Each transmitted data packet consists of a header part containing information of originating station (in this example, station 500), destination station (in this example, station 100 of FIG. 3), encoding, mesh route data, etc. A number of data bits of the header are also available for optional use. The header also comprises mesh mode channel switch announcement elements and a mesh channel switch parameters element.

The Counter 503 counts the amount of received data packets and the amount of dropped data packets, and forwards to the controller 502 the number of dropped data packets.

The controller 502 determines if the number of dropped data packets, i.e. the packet drop error rate, exceeds a drop threshold e.g. the drop threshold may be that a maximum of 10% of the received data packets may be dropped. It is to be understood that the drop threshold may have other values such as 20%, 40%, 50% etc as it may be dynamically set depending on network parameters such as signal to noise ratio SNR, amount of network resources, geographical location etc. If the packet drop error rate exceeds the drop threshold, the controller 502 is further configured to determine if one or more communication criterion is fulfilled. If the one or more communication criterion is fulfilled, the controller causes the header setter 504 to set the mesh mode channel switch announcement and the mesh channel switch parameter element in the header of the data packets for transmission. The controller 502 is then further configured to cause the transceiver 501 to transmit the data packets and to cause the station 500 to switch to a second communication channel for continuous transmission of data packets to the second station.

When the communication between the station 500 and the second station has ended, the controller 502 causes the station 500 to return to the first communication channel where a new communication with another station, e.g. any of the other stations 100 in FIG. 3 may be initiated.

The one or more communication criterion may e.g. be that the station 500 experiences a high RSSI—received signal strength indicator—and/or that the station 500 detects that network comprises a number of peers, or neighboring stations, exceeding a peer threshold which indicates that the mesh network has a dense network topology.

A high RSSI indicates the signal strength of the communication is good, and the reasons for the increased amount of dropped packets may then be too much interference from other neighboring stations. A high RSSI may e.g. be above 70%.

In the same manner, if the drop threshold is exceeded, and the station detects that the number of neighboring stations in the mesh network exceeds the peer threshold, it is an indication that the neighboring stations cause too much interference.

The peer threshold may e.g. be 10 peers, or 50 peers, or 100 peers. Other peer thresholds are of course possible. The peer threshold may be set based on network parameters, such as network range, amount of network resources, signal strength etc. For example, a network where the signal strength is low may have a low peer threshold, such as 5 or 10.

As indicated by the dashed box in FIG. 5, in some embodiments, the controller 502 and the header setter 504 may be integrated into the same unit.

When the mesh mode channel switch announcement and the mesh channel switch parameter of the data packets are set, the second station, e.g. station 100 in FIG. 3, with which the station 500 communicates, will be able to detect that a communication channel switch is to be made when the data packet is received. If the communication is relayed through multihop, i.e. several intermediate stations forward the data packets between the station 500 and the second station, then the intermediate stations will also be able to detect that a communication channel switch is at hand.

Figure 6B:
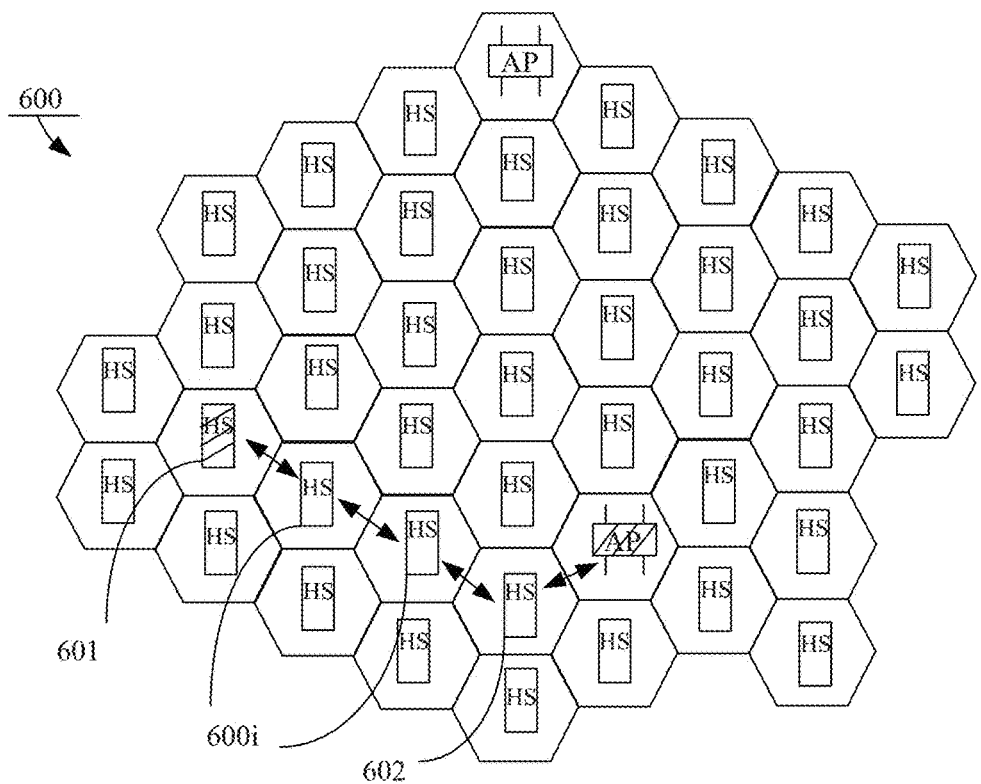
FIG. 6, which includes FIGS. 6a and 6b, each illustrate a mesh network scenario according to some embodiments.
Figure 6A:
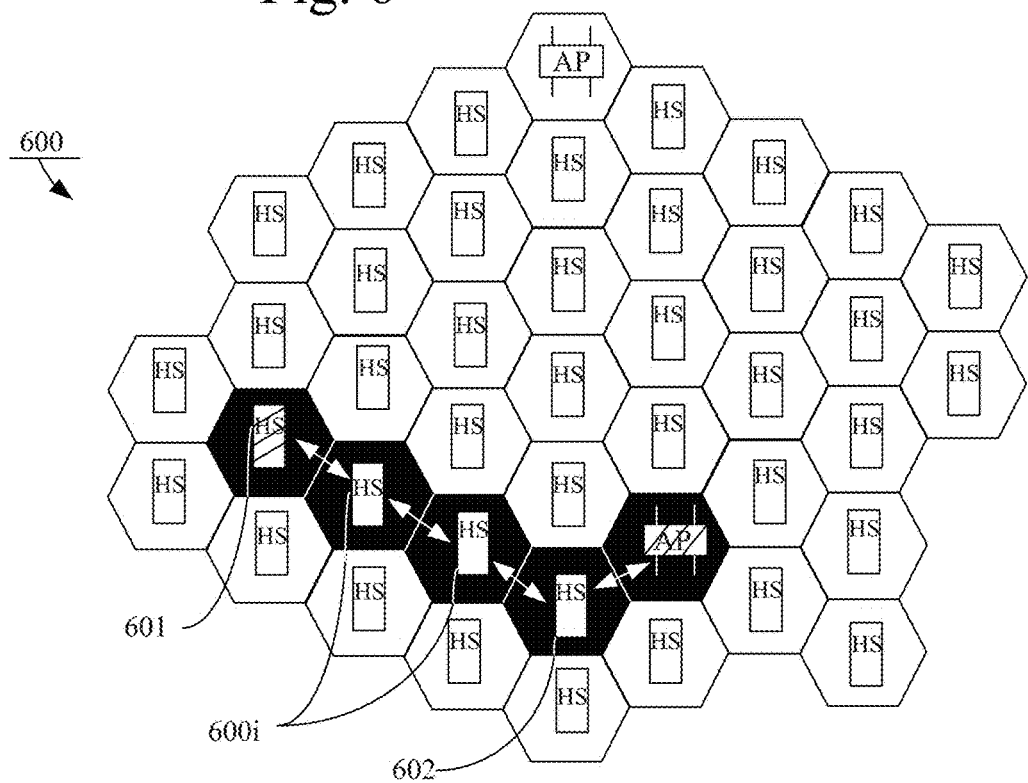

FIGS. 6a and 6b illustrates a typical scenario in dense network according to some embodiments. In 6a a mesh network 600 comprises several stations and typically makes up a dense mesh network. Station 601, which may be the station 509 in FIG. 5, has initiated a communication with station 602, which may e.g. be any of the stations 100 of FIG. 3. In some embodiments, the mesh network 600 may be a mesh network such as the mesh network described in FIG. 3 and the stations 601, 602 may be a station such as the station 100 in FIGS. 1, 2, and 3.

The communication between the first station 601 and the second station 602 is initiated on a first communication channel, which first channel may have a frequency which is utilized by several of the neighboring stations within the network (or other neighboring networks). The communication follows a communication line as indicated by the transmission arrows from the first station 601 through intermediate stations 600i to the second station 602.

If during the communication, the first station 601 detects that the packet error rate is exceeding a drop threshold (compare with the controller function as described in FIG. 5) while a communication criterion, such as that the RSSI of the communication is above an RSSI threshold, such as 70%, or that the number of neighboring stations within radio range is above a peer threshold, is fulfilled. The first station 601 may determine that a switch or movement of the communication channel from the first communication channel to a second communication channel should be made. The peer threshold may e.g. be set at 10, but it may also be set at a higher or lower integer depending on network parameters such as resources, signal quality, geographical parameters, etc.

The first station 601 thus sets a mesh mode channel switch announcement element and a mesh channel switch parameter element in the header of the data packets to be transmitted to the second station 602.

In FIG. 6b the data packets with the set header has been transmitted from the station 601 to the station 602 through the intermediate stations 600i as indicated by the transmission arrows. The dark cells around the station 601, the station 602 and the intermediate stations indicate that all stations within the communication line have switched to the second communication channel upon receiving a data packet where the mesh mode channel switch announcement element and the mesh channel switch parameter element in the header have been set.

The second communication channel is of another frequency than the first communication channel and therefore the interference from neighboring stations is reduced.

In some embodiments, especially if mesh stations are synchronized in time, a time slot booking mechanism may be utilized in order to time schedule the change of communication channel changes. In case of 802.11 MESH, the MCCA function may be used to schedule and book the change of communication channel in coordination with other stations within the network. The MCCA is a distributed channel reservation protocol and allows mesh stations to make reservations in the future, thus avoiding frame collisions from other mesh stations.

Thus, it is avoided that the second communication channel also becomes subjected to massive interference.

For example, if the mesh network includes more than 2 stations, especially if 2 or more stations collaborate and communicates as a group (for instance group call or group gaming). All included stations in a specific collaboration may use the same time slot and channel setting according to the schedule.

The switch or movement may thus be constant, such as they can happen continuously or at any time that is unrestricted in time, or they can be time scheduled, that is happen at specific time slots.

By applying a frequency distribution scheme, or a channel re-use, interference from neighboring station may be significantly reduced. The frequency, i.e. the second communication channel, adopted for the signaling route may then be included as a part of the routing tables of the respective stations.

When the communication between the first station 601 and the second station 602 is ended, or terminated, all the stations 601, 602, 600i return to the first communication channel so that they may initiate new communications with other stations.

This provides for a clever manner of reducing interference while still enabling new connections to be established without relying on central control, such as through a server.

The communication may end when all data packets have been transmitted, or if during a voice call either the first station 601 or the second station 602 terminates the call. The communication may also end if a link is broken between any of the stations 601, 602 and 600i, e.g. a link may be broken if one station moves out of range of the mesh network, or if one or more stations experience bad signal conditions.

Figure 7:
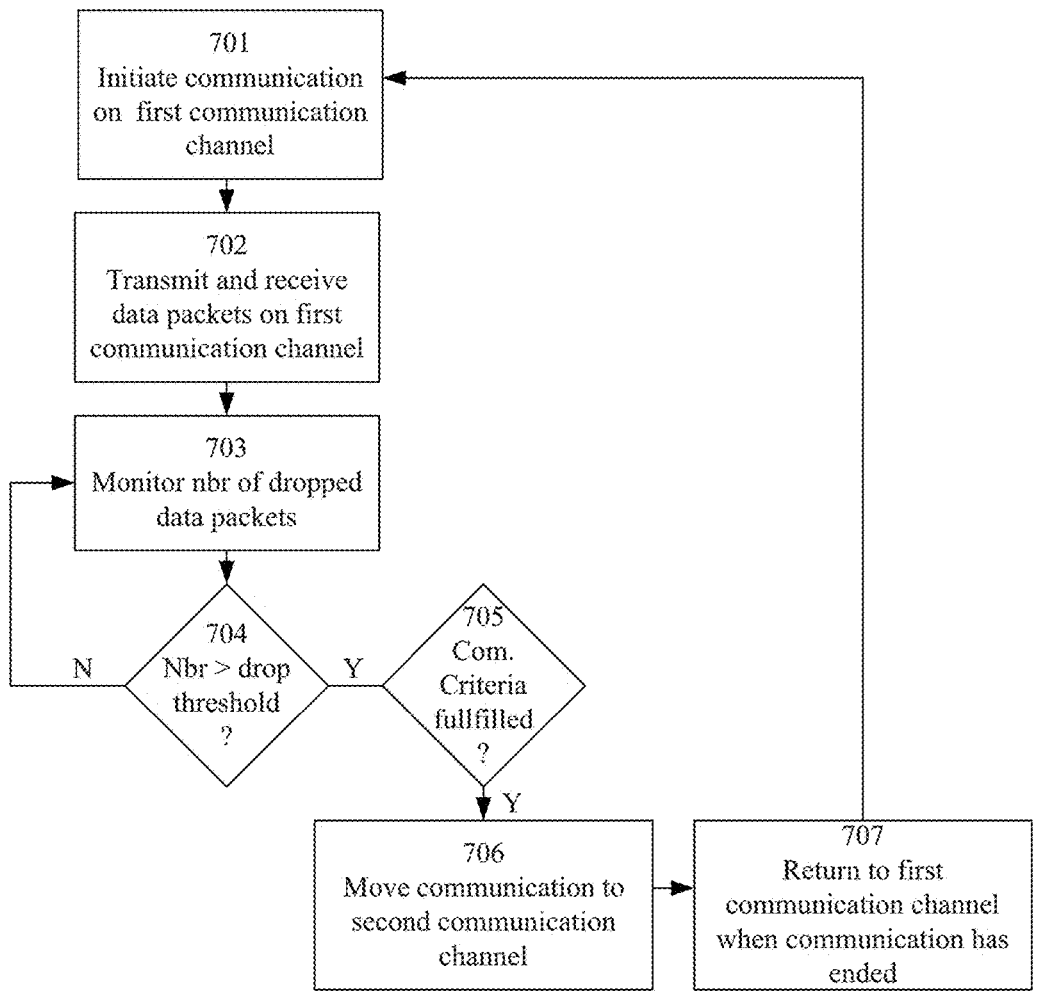
FIG. 7 illustrates an example method according to some embodiments.

FIG. 7 illustrates an example method 700 for a station in a mesh network according to some embodiments. The method 700 may e.g. be carried out by any of the stations as described in FIGS. 1, 2, 3, 5, 6a and 6b.

The method starts in when a first station, e.g. station 601 in FIGS. 6a and 6b, initiates 701a communication with a second station, e.g. one of the stations 602 in FIGS. 6a and 6b on a first communication channel having a frequency which is used by all stations within the mesh network. The first station and the second station exchange 702 data packets on the first communication channel. The first station transmits data packets to the second station, and receives data packets from the second station. While transmitting data packets, the first station monitors 703 the number of dropped data packets, or the packet error rate of the communication.

If the first station determines 704 that the packet error rate is below a drop threshold (N-path out of 704) the method 700 returns to monitoring 703 the number of dropped data packets.

If the first station determines 704 that the packet error rate is above the drop threshold (Y-path out of 704) the method continues to determining 705 if a communication criterion is fulfilled.

The communication criterion may e.g. be that the station experiences the RSSI of the communication to be high exceeding a RSSI threshold. The RSSI threshold may e.g. be set at 70% or higher, in some embodiments it may also be set lower depending on network parameters such as amount of network resources, network topology, etc.

The communication criterion may in some embodiments be fulfilled if the station detects the presence of a number of neighboring stations (also denoted as peers in this disclosure) exceeds a peer threshold, such as 10 peers or more, or the communication criterion may be a combination of high RSSI and a high number of neighboring stations.

If the station detects 705 that the communication criterion is fulfilled (Y-path out of 705), the method continues with the first station moving 706 the communication from the first communication channel to a second communication channel having another frequency than the first communication channel.

When the communication is terminated or otherwise ended, e.g. all data packets have been transmitted, or a voice call is finished, the station returns 707 to the first communication channel in order to be able to initiate a new communication with another peer, e.g. any of the stations 100 in FIG. 3 or any of the other stations illustrated in FIGS. 6a and/or 6b.

The drop threshold and peer threshold may be predetermined, or they may dynamically set based on network parameters. Such parameters may e.g. be amount of network resources, network topology, signal strength, etc. For example, if resources are limited it may be difficult to switch to the second communication channel, and the thresholds may therefore be set high.

A high drop threshold may for example mean that several data packets need to be dropped, such as every second, third or fourth data packet which drop rate would severely affect the communication performance before the station is allowed to change communication channel.

In some embodiments, the method 700 may also comprise setting a mesh mode channel switch announcement element and a mesh channel switch parameter element in a header of the transmit data packets prior to moving 706 the communication from the first communication channel to the second communication channel.

Figure 8:
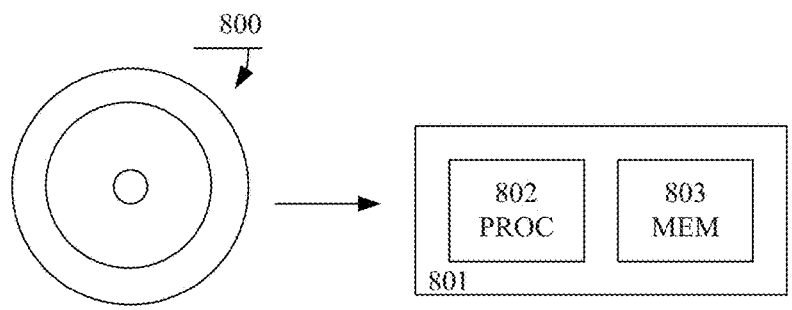
FIG. 8 illustrates a computer program product according to some embodiments.

FIG. 8 illustrates a computer program product 800 according to some embodiments. Computer program product comprises a computer readable medium such as, for example, a diskette or a CD-ROM. The computer readable medium may have stored thereon a computer program comprising program instructions. The computer program may be loadable into a data-processing unit 801, which may, for example, be comprised in a mesh station, e.g. any of the mesh stations as described in FIGS. 1, 2, 3, 5, 6 and/or 7. When loaded into the data-processing unit 801, the computer program may be stored in a memory, MEM, 803 associated with or integral to the data-processing unit 801. The data-processing unit also comprises a processor (PROC) 802. According to some embodiments, the computer program may, when loaded into and run by the data-processing unit, cause the processor 802 to execute method steps according to, for example, the method described in FIG. 7.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A station of a mesh network wherein the station is configured to transmit and receive data packets comprising a header comprising a mesh mode channel switch announcement element and a mesh channel switch parameter element, wherein the station comprises
    a controller configured to initiate communication with at least one second station on a first communication channel along a path that involves a subset of the stations in the mesh network;
    a transceiver configured to transmit and receive data packets to and from the at least one second station on the first communication channel;
    a counter configured to monitor an amount of lost data packets; wherein
    if the amount of lost data packets exceeds a drop threshold, the controller is further configured to determine if at least one communication criterion is fulfilled, said at least one communication criterion being indicative that the mesh network has a dense network topology, and
    if the controller determines that the at least one communication criterion is fulfilled, the controller is configured to move the communication from the first communication channel to a second communication channel along said path during the remainder of the communication, and
    wherein the station is configured to return to the first communication channel when the communication with the at least one second station is terminated.

2. The station according to claim 1, wherein the movement of the communication from the first communication channel to the second communication channel is unrestricted in time or time scheduled.

3. The station according to claim 1, wherein a frequency of the first communication channel is separate from a frequency of the second communication channel.

4. The station according to claim 1, wherein the at least one communication criterion is fulfilled if the station experience a RSSI—received signal strength indicator—value above an RSSI threshold.

5. The station according to claim 1, wherein the at least one communication criterion is fulfilled if the mesh network comprises a number of peers exceeding a peer threshold.

6. The station according to claim 1, wherein the station is configured to prior to moving the communication from the first communication channel to the second communication channel, set the mesh mode channel switch announcement element and the mesh channel switch parameter element in the data packet header, so as to cause the at least one second station to switch to the second communication channel.

7. The mesh station according to claim 1, wherein the communication is a stream of data packets.

8. The mesh station according to claim 1, wherein the communication is a voice call.

9. The mesh station according to claim 1, wherein the station is further configured to schedule the change of communication channel by using a time slot booking mechanism so that the change of communication channel is scheduled and booked in coordination with other peers and that the stations involved in the communication communicate using a same time slot and channel settings.

10. A method for a station in a mesh network, wherein the station is configured to transmit and receive data packets comprising a header comprising a mesh mode channel switch announcement element and a mesh channel switch parameter element, the method comprising
    initiating communication with at least one second station on a first communication channel along a path that involves a subset of the stations in the mesh network;
    transmitting and receiving data packets to and from the at least one second station on the first communication channel;
    monitoring an amount of lost data packets; and
    if the amount of lost data packets exceeds a drop threshold, determining if at least one communication criterion is fulfilled, said at least one communication criterion being indicative that the mesh network has a dense network topology, and
    if the at least one communication criterion is fulfilled, moving the communication from the first communication channel to a second communication channel along said path during the remainder of the communication, and
    returning to the first communication channel when the communication with the at least one second station in terminated.

11. The method according to claim 10, wherein the movement of the communication from the first communication channel to the second communication channel is unrestricted in time or time scheduled.

12. The method according to claim 10, wherein a frequency of the first communication channel is separate from a frequency of the second communication channel.

13. The method of claim 10, wherein the method further comprises determining that the at least one communication criterion is fulfilled by
    determine that the RSSI—Received Signal Strength Indicator—is above a RSSI threshold.

14. The method according to claim 10, wherein the RSSI threshold is dynamically set based on at least one network parameter, wherein the at least one network parameter for example is one or more of an amount of network resources, network topology, radio connection range and or signal to noise ratio -SNR-.

15. The method of claim 10, wherein the method further comprises determining that the at least one communication criterion is fulfilled by;

determine that a number of peers in the mesh network exceeds a peer threshold.

16. The method according to claim 15, wherein the peer threshold is dynamically set based on at least one network parameter, wherein the at least one network parameter for example is one or more of an amount of network resources, network topology, radio connection range and or signal to noise ratio -SNR-.

17. The method according to claim 10, further comprising setting the mesh mode channel switch announcement element and a mesh channel switch parameter element in the data packet header prior to moving the communication from the first communication channel to the second communication channel, so as to cause the at least one second station to switch to the second communication channel.

18. The method according to claim 10, wherein the change of communication channel is scheduled using a time slot booking mechanism so that the change of communication channel is scheduled and booked in coordination with other peers and that the stations involved in the communication communicate using a same time slot and channel settings.

19. A computer program product comprising a non-transitory computer readable medium, having thereon a computer program comprising program instructions, the computer program being loadable into a data-processing unit and adapted to cause execution of the method according to claim 18 when the computer program is run by the data-processing unit.

* * * * *